United States Patent

[11] 3,575,215

[72] Inventor Ronald J. Boddy
Monte Sereno, Calif.
[21] Appl. No. 763,675
[22] Filed Sept. 30, 1968
[45] Patented Apr. 20, 1971
[73] Assignee Sylvania Electric Products Inc.,

[54] PULSE TRAIN EXTRACTOR SYSTEM
5 Claims, 9 Drawing Figs.

[52] U.S. Cl. .......... 328/139, 328/37, 328/72, 328/119, 178/69.5
[51] Int. Cl. .......... H03k 13/00
[50] Field of Search .......... 328/63, 72, 73, 119, 138, 139, 140, 37; 330/107, 126; 178/69.5; 307/233

[56] References Cited
UNITED STATES PATENTS

| | | | |
|---|---|---|---|
| 2,980,858 | 4/1961 | Grondia et al. | 328/73X |
| 3,047,806 | 7/1962 | Heslop | 328/119X |
| 3,209,265 | 9/1965 | Baker et al | 328/72X |
| 3,238,462 | 3/1966 | Ballard et al | 328/63 |
| 3,423,728 | 1/1969 | Wissel | 328/119X |

*Primary Examiner*—John S. Heyman
*Attorneys*—Norman J. O'Malley, John F. Lawler and Russell A. Cannon

ABSTRACT: This system consists of a clock generator which controls the rate at which pulses of an incident pulse train are advanced through a shift register. The input to and the output of the shift register are logically combined in an AND gate. When the clock frequency is adjusted to be related to the pulse repetition frequency (*PRF*) of the pulses so that a pulse is in the last stage of the shift register at the same time that a succeeding pulse is received at the input thereof, the AND gate produces an output pulse. This operation is repetitive resulting in extraction of the pulse train.

| | J | K | $Q_{n+1}$ |
|---|---|---|---|
| 1 | 0 | 0 | $Q_n$ |
| 2 | 1 | 0 | 1 |
| 3 | 0 | 1 | 0 |
| 4 | 1 | 1 | $\bar{Q}_n$ |

TABLE 1

INVENTOR.
RONALD J. BODDY
BY Russell A. Cannon
AGENT

INVENTOR.
RONALD J. BODDY

BY Russell A. Cannon
AGENT

INVENTOR.
RONALD J. BODDY

BY Russell Alannon

AGENT

| | DATA PULSE 3 | $t_S$ (3-2) | DATA PULSE 2 | $t_S$ (2-1) | DATA PULSE 1 |
|---|---|---|---|---|---|
| | 1 | 2 | 3 | 4 | 5 |
| 1 | $P_o$ | $nt_c$ | n | $(n-1)\ t_c$ | 2n-1 |
| 2 | $P_o$ | $(n-1)t_c$ | n-1 | $nt_c$ | 2n-1 |
| 3 | $P_o$ | $nt_c$ | n | $nt_c$ | 2n |
| 4 | $P_o$ | $(n+1)t_c$ | n+1 | $nt_c$ | 2n+1 |
| 5 | $P_o$ | $nt_c$ | n | $(n+1)\ t_c$ | 2n+1 |

TABLE 2

INVENTOR.
RONALD J. BODDY
BY Russell A. Cannon
AGENT

INVENTOR.
RONALD J. BODDY

BY *Russell A. Cannon*
AGENT

| DATA PULSE NUMBER | FUNDAMENTAL | 2ND HARMONIC | 3RD HARMONIC | 4TH HARMONIC | 5TH HARMONIC |
|---|---|---|---|---|---|
| 1 | 200 | 200 | 200 | 200 | 200 |
| 2 | 100 | 150 | 166.7 | 175 | 180 |
| 3 | 0 | 100 | 133.3 | 150 | 160 |
| 4 | | 50 | 100 | 125 | 140 |
| 5 | | 0 | 66.7 | 100 | 120 |
| 6 | | | 33.3 | 75 | 100 |
| 7 | | | 0 | 50 | 80 |
| 8 | | | | 25 | 60 |
| 9 | | | | 0 | 40 |
| 10 | | | | | 20 |
| 11 | | | | | 0 |

TABLE 3

INVENTOR.
RONALD J. BODDY

BY Russell A. Cannon
AGENT

PULSE TRAIN EXTRACTOR SYSTEM

BACKGROUND OF THE INVENTION

This invention relates to identification of electromagnetic signals and more particularly to a system utilizing pulse repetition frequency (*PRF*) for deinterleaving and extracting a single pulse train from a number of pulse trains having different *PRF*'s.

In a prior art technique for extracting pulses a first one-shot multivibrator or delay generator having a predetermined delay is set by the first pulse of a train of pulses having a fixed pulse recurrence interval (*PRI*) This first pulse is applied to and inhibits an AND gate. Automatic reset of the first one-shot sets a second one-shot multivibrator which enables the AND gate. The time interval that the AND gate is enabled by the second one-shot is referred to as the extractor gate period. If the next pulse is received during the time that the AND gate is enabled, this pulse is passed by the AND gate to the output of the system. This second pulse also sets the first one-shot and resets the second one-shot. If the pulses are synchronized with the operation of the multivibrators the pulse train is extracted by the system. As used herein, the term synchronization means coincidence in time between pulses of the signal and the extractor gate period. In a noisy environment in which several pulse trains are interleaved, synchronization of the pulses and the system may be lost. Several pulses must then be received before synchronization is again obtained. This results in intermittent extraction of the pulse train. It is also difficult to obtain with this system a narrow extractor gate period which is desireable to increase discrimination against interleaved pulse trains. This system also has a harmonic ambiguity in that it will provide the same extracted pulse train whether the *PRF* of input pulses is equal to that which the system is tuned to respond to or an integral multiple thereof. This invention is directed to the provision of a system which overcomes these disadvantages.

An object of this invention is the provision of an improved system for measuring the *PRF* of a single pulse train in a noisy environment containing a number of pulse trains having different *PRF*'s.

Another object is the provision of an improved system for extracting a pulse train having a *PRF* within prescribed limits from an input containing several pulse trains having different *PRF*'s.

SUMMARY OF INVENTION

In accordance with this invention, a train of pulses is advanced through a digital delay line by clock pulses from a variable frequency (tunable) clock generator. The input and output of the delay line are logically combined to produce an output pulse when the *PRF* of the pulse train is such that a pulse is passed by the delay line at the same time that a succeeding pulse is received. This operation is repetitive and results in extraction of the pulse train. In one embodiment of this invention, the train of pulses is advanced through a plurality of digital delay lines of equal length that are connected in series. The input signal and the outputs of the delay lines are logically combined to extract the pulse train. In a modified form of this invention, the outputs of associated stages at the end of each delay line are logically combined with each other and with the input to increase the range of *PRF*'s over which extraction will be effected.

DESCRIPTION OF THE DRAWINGS

FIG. 9 is a block diagram of a system for indicating whether an extractor embodying this invention is operating on a fundamental *PRF* of a harmonic thereof;

Figure 7:
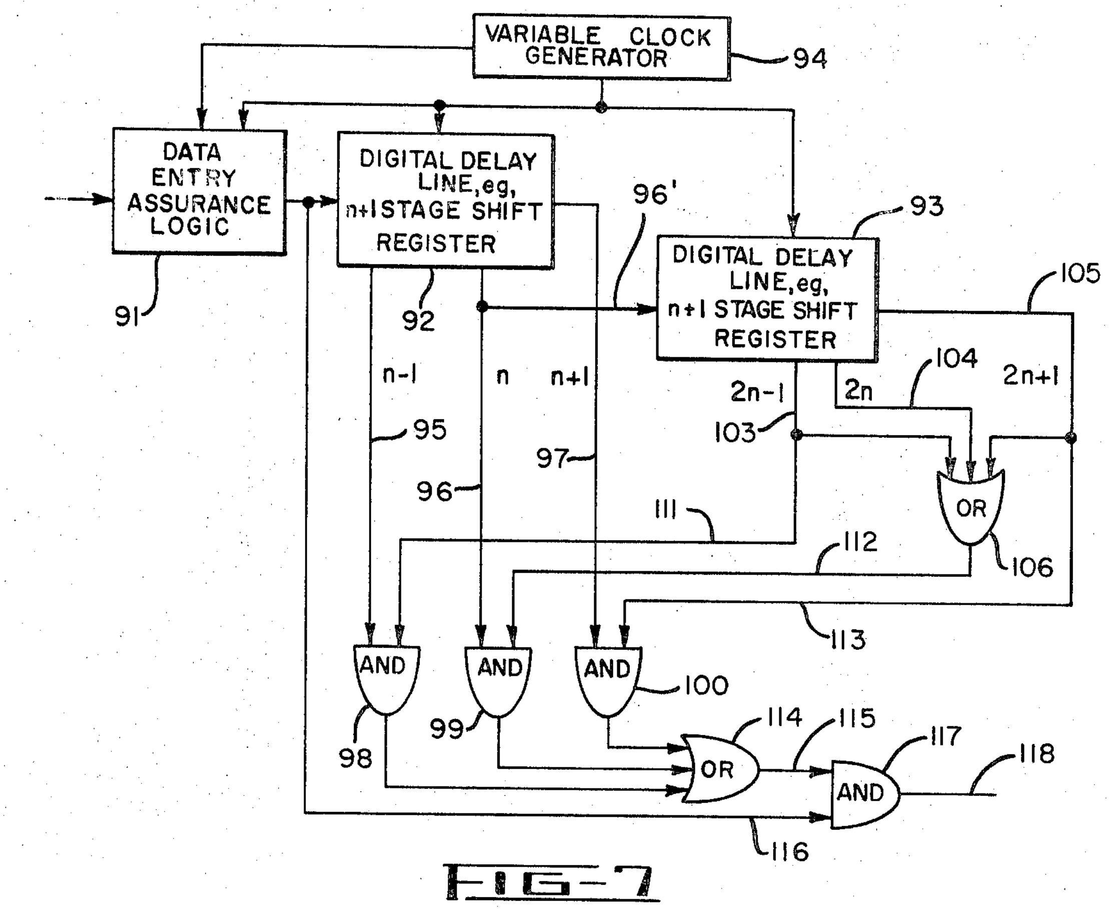
FIG. 7 is a block diagram of a third system embodying this invention.
Figure 5:
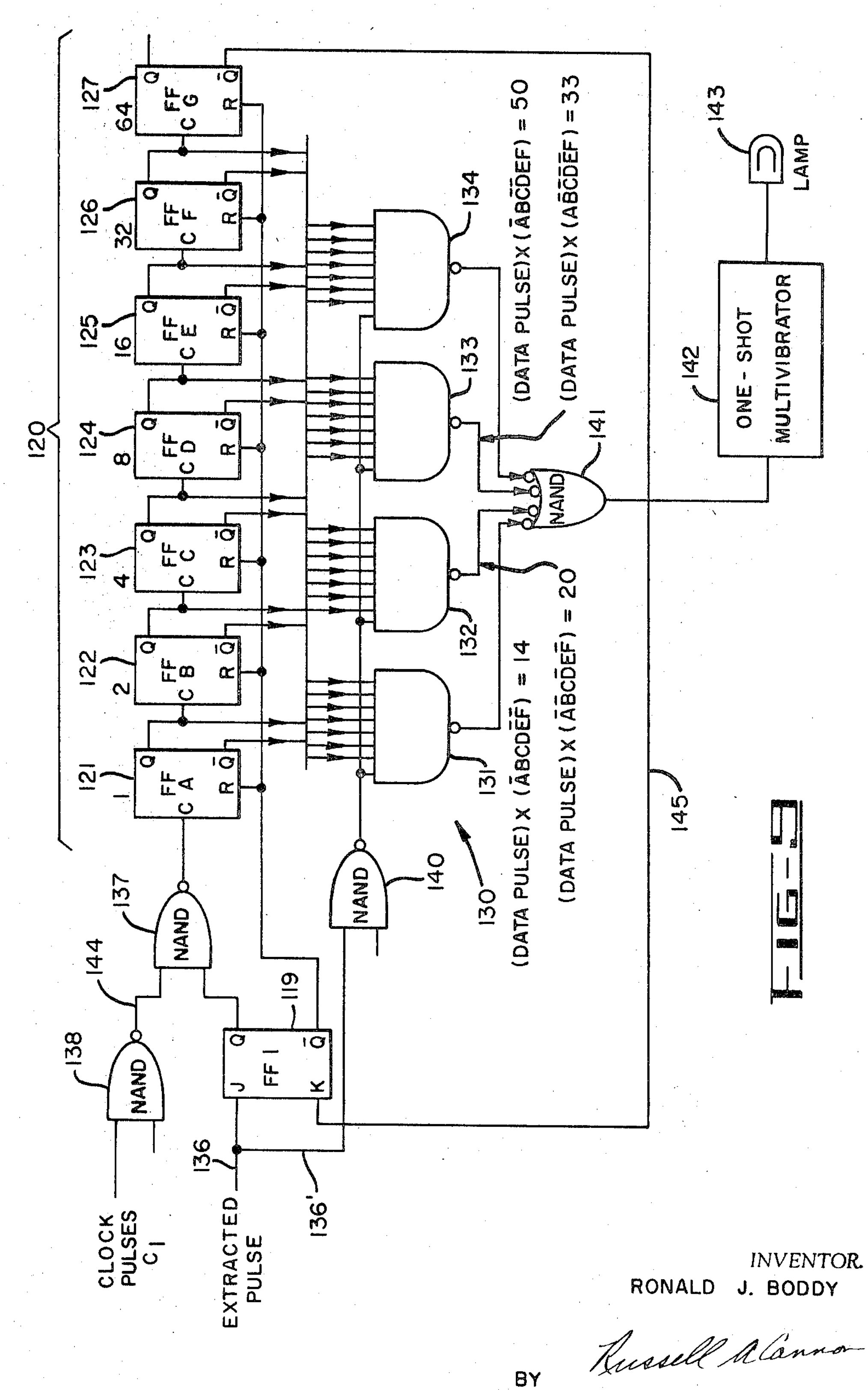

TABLE 1 illustrates the operation of a J–K flip-flop;

TABLE 2 illustrates the operation of the system of FIG. 7; and

Figure 5:
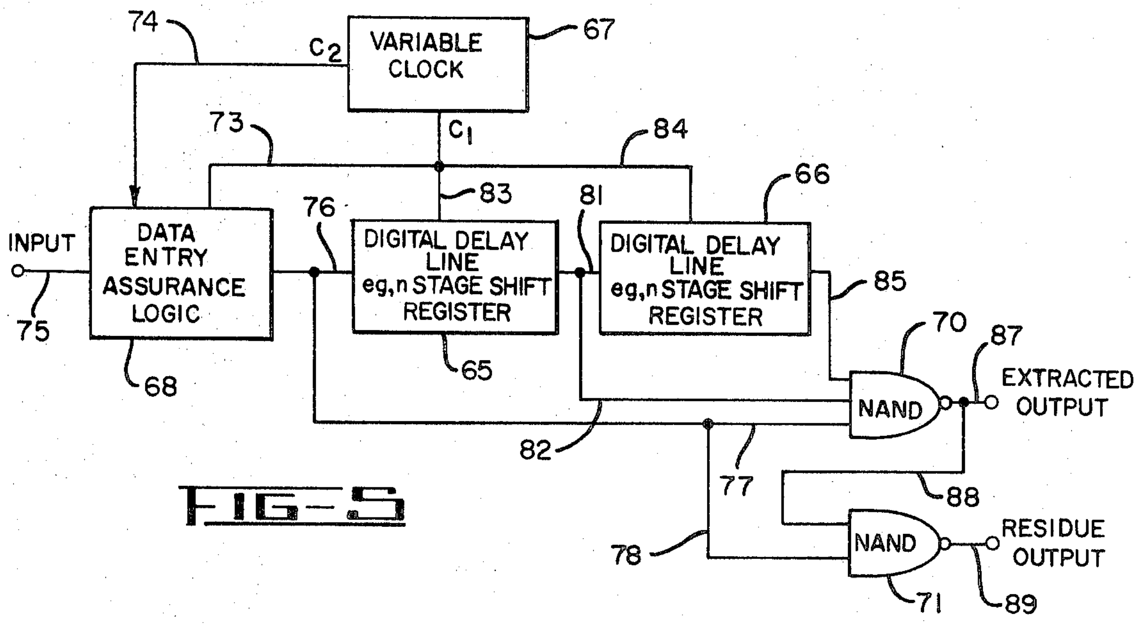
FIG. 5 is a block diagram of another system embodying this invention.

TABLE 3 illustrates the operation of the system of FIG. 5 for input pulse trains having *PRF*'s that are integral multiples of the operating frequency of the registers.

DESCRIPTION OF PREFERRED EMBODIMENTS

Figures 1, 2:
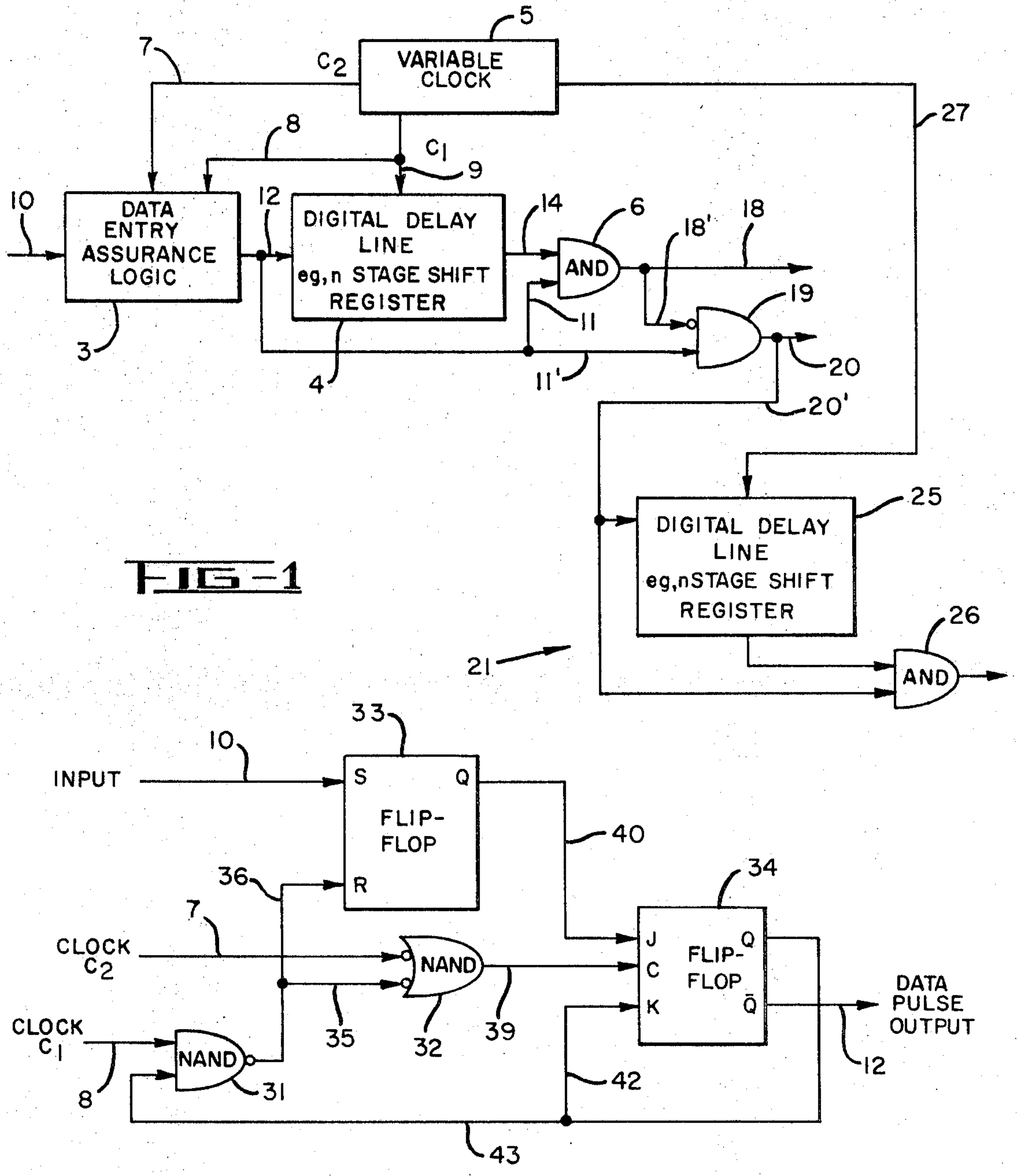
FIG. 1 is a block diagram of a system embodying this invention.
FIG. 2 is a detailed schematic block diagram of the data entry assurance logic (DEAL) circuit of FIG. 1.

Referring now to FIG. 1, a pulse extractor embodying this invention comprises data entry assurance logic (DEAL) circuit 3, digital delay line 4, variable frequency clock generator 5 and an AND gate 6. The delay line may, by way of example, comprise an *n* stage shift register. Clock pulses from generator 5 are applied on lines 7 and 8 to logic circuit 3 and on line 9 to the shift register. The frequencies of clock pulses on line 7 and on lines 8 and 9 are equal, although the clock pulses are offset in time. Trains of input pulses are applied on line 10 to logic circuit 3. DEAL circuit 3 is responsive to clock pulses for producing an output data pulse that is representative of receipt of an input pulse. The data pulse output of logic circuit 3 is applied on line 11 to the first input to AND gate 6 and on line 12 to the shift register. The output of the register is applied on line 14 to the second input of gate 6. The output of gate 6 is the extracted pulse train.

In operation, consider that the first pulse of a train of pulses is received on line 10. Logic circuit 3 is responsive to the clock pulses for producing and holding a data pulse output signal that is representative of receipt of the input pulse. The shift register and logic circuit 3 are responsive to clock pulses for entering the data pulse in the first stage of the register and resetting the logic circuit. Since the last stage of the register is empty when the first data pulse is generated, AND gate 6 is inhibited from extracting the first input pulse, i.e., from producing an output pulse on line 18.

The first data pulse is stepped through the shift register at the clock frequency $f_c$ by the clock pulses $C_1$ on line 9. If the *PRF* of the input pulse train is equal to the frequency $f_c/n$ a second data pulse corresponding to receipt of the second input pulse will be produced by logic circuit 3 when the first data pulse is in the $n^{th}$ stage of the register. Since data pulses are simultaneously present on lines 11 and 14, AND gate 6 extracts the second input pulse by producing an output pulse on line 18. This operation is repetitive resulting in extraction of the input pulse train having a *PRF* equal to the frequency $f_c/n$. The extractor is tuned to extract a pulse train having a different *PRF* by changing the clock frequency $f_c$. This invention is particularly useful in applications where the input is made up of a number of interleaved pulse trains each having a different *PRF*. The pulse train produced on line 18 by AND gate 6 corresponds to an input pulse train having a *PRF* of $f_c/n$. A residue signal (i.e., the input signal minus the extracted pulse train on line 18) is produced on line 20 by coupling the extracted signal on line 18′ and the data pulses on line 11′ to the inputs of gate 19.

A second pulse train having a different *PRF* may be extracted from the input signal by processing the residue signal on line 20′ in a second pulse extractor 21. This extractor comprises a shift register 25 and an AND gate 26. Register 25 is responsive to clock pulses on line 27 which have a clock frequency $f_c'$ that is different from and independent of the clock frequency $f_c$ on lines 7, 8 and 9. The operation of extractor 21 is identical to that described above.

Since clock pulses and pulses of an input pulse train are neither frequency nor phase synchronized, input pulses may be received between the time of generation of adjacent clock pulses. In order to extract such a pulse train it is necessary to either lengthen an input pulse or reposition it to span the following clock pulse. This function is performed by the data entry assurance logic circuit.

Referring now to FIG. 2, DEAL circuit 3 comprises NAND gates 31 and 32, and flip-flops 33 and 34. NAND gate 31 is responsive to clock pulses $C_1$ on line 8 for inverting these clock pulses when the second input thereof is a logic level 1. The output of NAND gate 31 is coupled on line 36 to the reset input R of flip-flop 33. NAND gate 32 is responsive to the output of gate 31 and clock pulses $C_2$ on line 7 and performs the function of an inverting OR gate. The output of gate 32 is coupled on line 39 to the clock input of J–K flip-flop 34. Input pulses on line 10 are connected to the set terminal S of flip-flop 33. The output of flip-flop 33 is coupled on line 40 to the J input of flip-flop 34. The Q output of the flip-flop 34 is coupled on line 42 to the K input thereof and on line 43 to the second input to NAND gate 31. The output of the logic circuit 3 is coupled on line 12 from the $\overline{Q}$ output of flip-flop 34.

The operation of J–K flip-flop 34 is illustrated in TABLE 1 wherein the digital representations in the J and K columns indicate logic levels or states of the associated input signals to flip-flop 34 when the clock pulse is applied thereto on line 39. The representations in the $Q_n+1$ column indicate the logic levels or states of the Q output of the flip-flop after the clock pulse is applied thereto. As indicated in row 1, when the J and K inputs are both O, the Q output will remain the same as it was before receipt of the clock pulse. If only the J input is a 1, as indicated in row 2, the Q output of the flip-flop is a 1. If only the K input is a 1, as illustrated in row 3, the Q output of the flip-flop is a 0. If both the J and K inputs are 1, however, as indicated in row 4, the Q output of the flip-flop is $\overline{Q}_n$ which means that the Q output of the flip-flop is the complement of what it was prior to receipt of the clock pulse.

Figure 3:
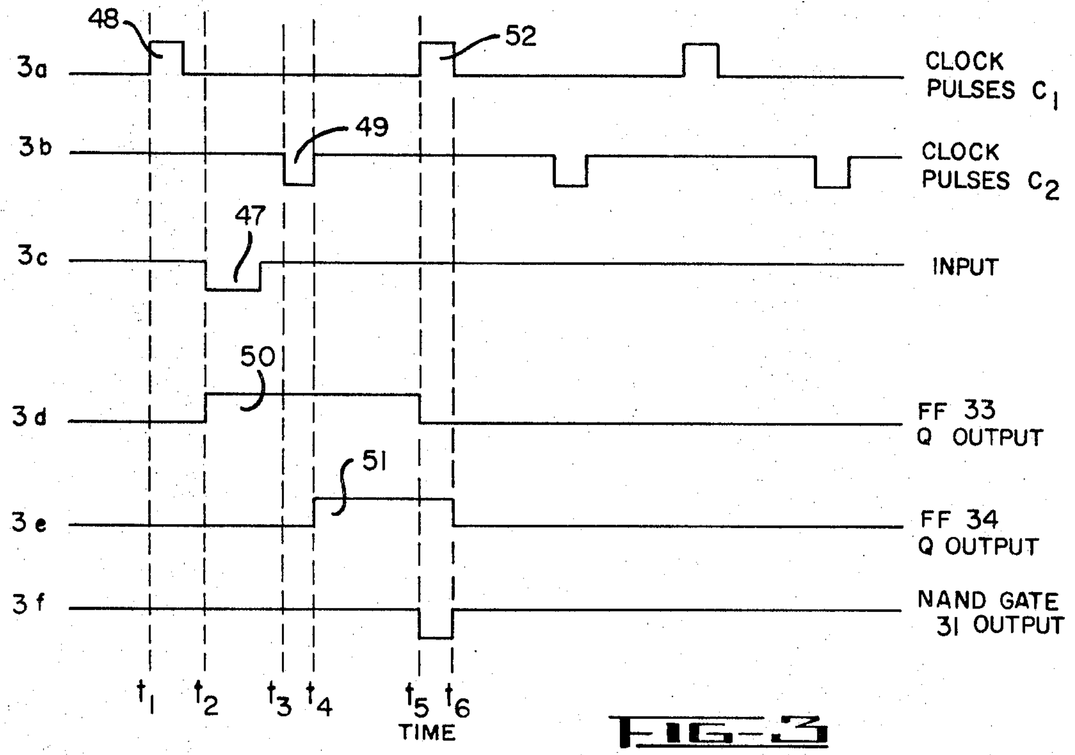
FIGS. 3 and 4 are waveforms illustrating the operation of the circuit of FIG. 2.
Figure 4:
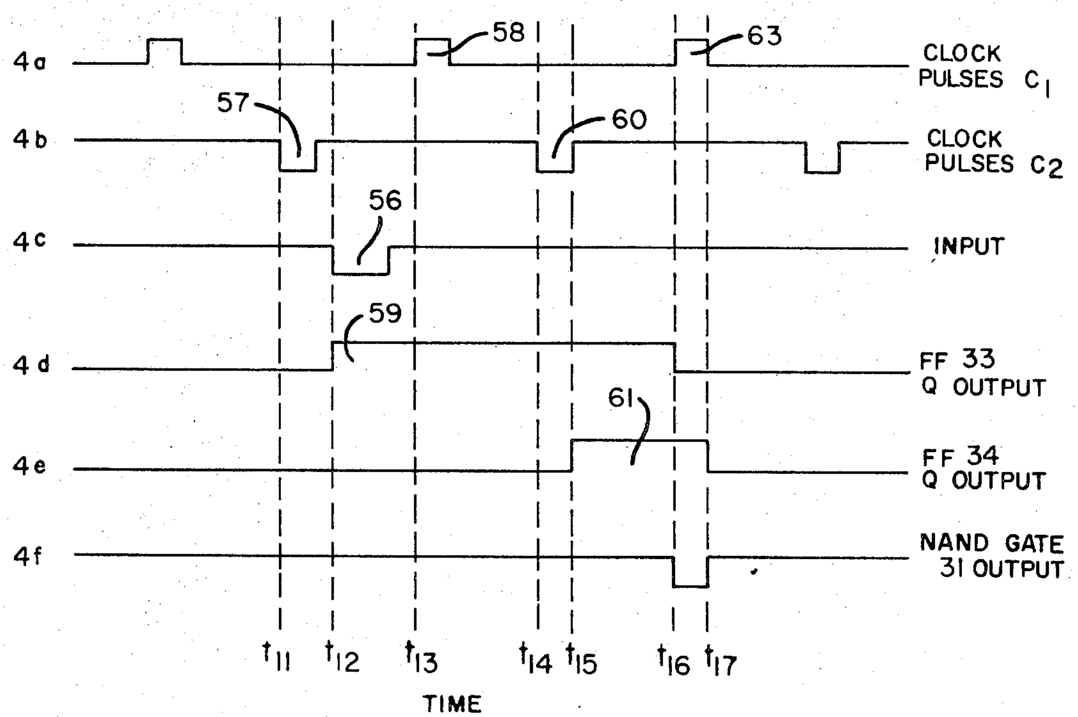

The operation of the DEAL circuit will now be described in relation to the waveforms of FIGS. 3 and 4. The waveforms of FIG. 3 illustrate the operation when an input pulse is received after generation of a clock pulse $C_1$ on lines 8 and 9 and prior to generation of a clock pulse $C_2$ on line 7. Conversely, the waveforms of FIG. 4 illustrate the operation when an input pulse is received after generation of a clock pulse $C_2$ on line 7 and prior to generation of a clock pulse $C_1$ on lines 8 and 9. Referring now to the drawings, the waveforms of FIGS. 3*a* and 4*a* represent clock pulses $C_1$ on lines 8 and 9; the waveforms of FIGS. 3*b* and 4*b* represent clock pulses $C_2$ on line 7; the waveform of FIG. 3*c* represents input pulses on line 10 wherein an input pulse is received immediately following generation of a clock pulse $C_2$ on line 7; the waveforms of FIGS. 3*d* and 4*d* represent the Q output of flip-flop 33; and, the waveforms of FIGS. 3*e* and 4*e* represent the Q output of flip-flop 34; and, the waveforms of FIGS. 3*f* and 4*f* represent the output of NAND gate 31.

During operation prior to receipt of an input pulse at time $t_2$, first and second trains of clock pulses $C_1$ and $C_2$ having the same clock frequency $f_c$ and the opposite polarity are produced on lines 8 and 7 (see FIGS. 3*a* and 3*b*) respectively. The clock pulses of these pulse trains are offset in time by the time interval $t_3$—$t_1$. The output of flip-flop 33 is a negative voltage which causes the Q output of flip-flop 34 to also be negative (see FIGS. 3*d* and 3*e*, respectively). Thus, a negative voltage is applied to the K input of flip-flop 34 and to the associated input of NAND gate 31.

Consider that input pulse 47 is received at time $t_2$ (see FIG. 3*c*) after generation of a first clock pulse 48 (see FIG. 3*a*) on lines 8 and 9 and prior to generation of a second clock pulse 49 (see FIG. 3*b*) on line 7. Flip-flop 33 is set by the leading (negative-going) edge of input pulse 47 at time $t_2$ and produces a positive voltage pulse 50 (see FIG. 3*d*) which is applied to the J input of flip-flop 34. The second clock pulse 49 (see FIG. 3*b*, time $t_3$) on line 7 is coupled to NAND gate 32 which produces an inverted pulse at the clock input of flip-flop 34. The positive voltage 50 on line 40 therefore causes flip-flop 34 to change operating states at time $t_4$ to produce a positive voltage pulse 51 on line 43 (see FIG. 3*e*) on the negative-going edge of the pulse on line 39. The voltage pulse 51 is the conjugate of the data entry pulse. NAND gate 31 is enabled by voltage pulse 51 so that it inverts the next clock pulse 52 (see FIG. 3*a*) and resets flip-flop 33 at time $t_5$ (see FIG. 3*d*) which produces a negative voltage on line 40. The output of gate 31 is inverted by gate 32 to reproduce clock pulse 52 on line 39. Flip-flop 34 is therefore reset on the negative-going edge of clock pulse 52 at time $t_6$ (see FIG. 3*e*) as is gate 31 (see FIG. 3*f*). Both flip-flops are now in their original operating states and ready for receipt of an input pulse. The data pulse is transferred into the first stage of register 4 on the negative-going edge of clock pulse 52 at time $t_6$.

Referring now to FIG. 4, consider that an input pulse 56 (see FIG. 4*c*) is received between a second clock pulse 57 (see FIG. 4*b*) and the first clock pulse 58 (see FIG. 4*a*). Prior to receipt of the input pulse 56, the output of flip-flop 34 is a negative voltage (see FIG. 4*e*) that inhibits NAND gate 31. The input pulse 56 sets flip-flop 33 at time $t_{12}$ causing a positive voltage pulse 59 (see FIG. 4*d*) to be applied to the J input of flip-flop 34. Since gate 31 is inhibited at time $t_{13}$ when the first clock pulse 58 is received, a pulse is not coupled to lines 36 and 39. Flip-flop 33 and 34 therefore remain in their initial operating states (see FIGS. 4*d* and 4*e*) and the information that an input pulse was received is stored in pulse 59. In the same manner as described above, the next second clock pulse 60 (see FIG. 4*b*, time $t_{14}$) is coupled through NAND gate 32 to cause flip-flop 34 to produce a positive output pulse 61 at time $t_{15}$ (see FIG. 4*e*) which enables gate 31. The first clock pulse 63 (see FIG. 4*a*) is therefore coupled through gate 31 to reset flip-flop 33 at time $t_{16}$ (see FIG. 4*d*) and through gate 32 to reset flip-flop 34 at time $t_{17}$ (see FIG. 4*e*) as described above. The data pulse is entered into the first stage of shift register 4 on the negative-going edge of clock pulse 63 at time $t_{17}$. Thus, it is seen that an input pulse train is entered into the shift register even though the time of occurrence thereof is not in exact frequency or phase synchronism with the clock pulses.

In a noisy environment and/or an environment of many interleaved pulse trains, "false" output pulses will occur whenever the time delay between any combination of noise pulses and/or interleaved pulses is equal to the delay period of the shift register. False output pulses are those obtained when no actual pulse train is present having a *PRF* equal to the frequency $f_c/n$. This situation is particularly undesirable in certain sophisticated applications requiring high reliability and low false alarm rates. The dual shift register extractor of FIG. 5 provides a substantial increase in discrimination against producing false output pulses in such an environment since it is less likely that the time interval between pulses will equal the shift register delay period for two consecutive time intervals. This is a necessary condition for pulse extraction in the dual shift register system.

Referring now to FIG. 5, a dual shift register extractor comprises a pair of *n*-stage shift registers 65 and 66, variable frequency clock generator 67, DEAL circuit 68 and NAND gates 70 and 71. Logic circuit 68 is responsive to clock pulses on lines 73 and 74 for producing data pulses corresponding to input pulses received on line 75. The data pulses are applied on line 76 to register 65 and on lines 77 and 78 to the first inputs of NAND gates 70 and 71, respectively. The output of shift register 65 is applied on line 81 to register 66 and on line 82 to the second input of gate 70. Data pulses are advanced through registers 65 and 66 by clock pulses on the associated lines 83 and 84. The output of the second shift register 66 is applied on line 85 to the third input of gate 70. The output of gate 70 is the extracted pulse train. This output is also applied on line 88 to the second input of gate 71.

During quiescent operation when an input pulse is absent from line 75, the shift registers are empty so that the signal levels applied to the NAND gates are all negative representing a logic level 0, for example, and the gate outputs are positive representing a logic level 1. The operation of logic circuit 68 is identical to that of logic circuit 3 in response to an input pulse and first and second clock pulses for generating a data pulse. The first data pulse is entered into the first stage of register 65 in response to an associated first clock pulse $C_1$ on line 83. Since the outputs of the registers are still zero when the first data pulse is generated, the operation and the output of the NAND gates remains unchanged.

If the next data pulse is produced one sampling time interval $t_s=nt_c$ later (where $t_c$ is the clock pulse interval) when the first data pulse is in the $n^{th}$ stage of register 65, the first and second data pulses are simultaneously entered in the first stages of registers 66 and 65, respectively, in response to the $n+1^{th}$ clock pulse $C_1$. Since the output of register 66 is still zero at this time, however, the output of and operation of the NAND gates remains unchanged.

If the next data pulse is produced $n$ first clock pulses later, it will be present on line 76 when the first and second data pulses are in the $n^{th}$ stages of registers 66 and 65, respectively. Since all of the inputs to NAND gate 70 are positive at the same time, gate 70 is caused to change operating states to extract the input pulse associated with the third data pulse by producing an output pulse on line 87. If the *PRF* of the input pulse train is equal to the frequency $f_c/n$, this operation is repetitive resulting in extraction of the pulse train.

The output of logic circuit 68 on line 78 is representative of input pulses received by the system. The output of NAND gate 70 on line 88 is representative of input pulses having a *PRF* equal to the frequency $f_c/n$ which are extracted by the system. NAND gate 71 is responsive to these trains of pulses on lines 78 and 88 for subtracting the extracted pulses from the input pulses to produce a residue signal on line 89.

The operation described above is based on frequency synchronism of the input *PRF* and the frequency $f_c/n$, i.e., on exact synchronism between each qualifying input pulse and every $n^{th}$ clock pulse. A qualifying input pulse is one that would be extracted by the system. When a small frequency difference exists between the *PRF* of qualifying pulses and the frequency $f_c/n$, the relative phase of each qualifying pulse and every $n^{th}$ clock pulse is different. By way of example, if the *PRF* of the qualifying pulses is 0.25 percent less than the frequency $f_c/n$, the *PRI* of qualifying pulses is $(n+0.0025)t_c$ where $t_c=1/f_c$ is the clock pulse interval. This means that in a dual shift register extractor where $n$ is 100, four qualifying pulse intervals are equal to 401 clock pulse intervals. This means that the first and second data pulses corresponding to input pulses each having a *PRI* of 100 clock pulses will be entered into the first stages of shift registers 65 and 66, respectively. Since the third data pulse, also having a *PRI* of 100 clock pulses, is applied to register 65 when the first and second data pulses are in the $n^{th}$ stages of the registers, the third data pulse is extracted by the system. The fourth data pulse, however, will be applied 101 clock pulses later to the input of register 65 and gate 70 after the previous two data pulses have been advanced from registers 66 and 65. Coincident gating therefore does not occur in gate 70 and extraction of the input pulse train is interrupted, i.e., the fourth input pulse is not extracted.

Although 100 clock pulses are produced prior to generation of the next data pulse, the associated input pulse is not extracted since the $n^{th}$ stage of register 66 is empty. The next two input pulses will be extracted, however, since 100 clock pulses are generated between each of the next two data pulses and the preceeding data pulse. The succeeding data pulse is generated 101 clock pulses later to again interrupt extraction of the input pulses. This operation is repetitive resulting in extracting two input pulses, missing the next two input pulses, extracting two input pulses, etc. This represents an extraction probability of 0.5.

Figure 6:
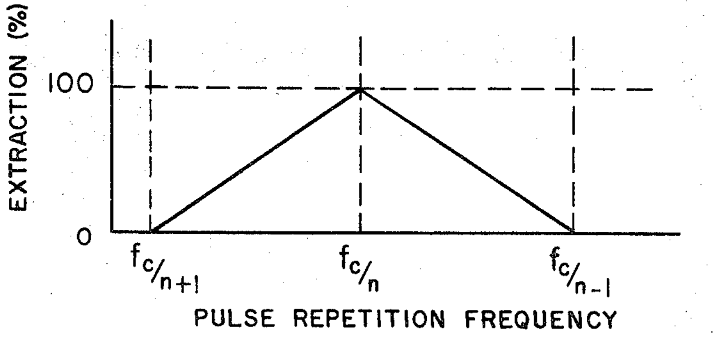
FIG. 6 is a curve illustrating the extraction provided by the system of FIG. 5.

The waveform of FIG. 6 illustrates the extraction provided by the dual shift register extractor of FIG. 5. When the *PRF* of the input pulse train is the frequency $f_c/n$, each input pulse of the incident pulse train is extracted by the system once the registers are loaded. This results in 100 percent qualification. If the *PRF* of the input pulse train is greater than or less than the frequency $(f_c)/(n\pm1)$, none of the pulses are extracted by the system. This triangular extraction characteristic is undesirable in certain applications.

A modified form of this invention which provides 100 percent extraction over a range of *PRF*'s is illustrated in FIG. 7. This system comprises DEAL circuit 91 and shift registers 92 and 93 which are each responsive to outputs of variable frequency clock generator 94. Logic circuit 91 is similar to the DEAL circuit 3 described above. Shift register 92 has $n+1$ stages and lines 95, 96 and 97 coupling the outputs of the last three stages thereof to inputs of AND gates 98, 99 and 100, respectively. The output of the $n^{th}$ stage of register 92 is also applied to register 93 on line 96'. Shift register 93 also has $n+1$ stages and lines 103, 104 and 105 coupling outputs of the last three stages thereof to inputs of OR gate 106. The output of OR gate 106 is the second input to AND gate 99. The outputs of the $n-1^{th}$ and $n+1^{th}$ stages of register 93 are coupled on lines 111 and 113 to the second inputs of gates 98 and 100, respectively. The outputs of AND gates 98, 99 and 100 are each coupled to inputs of OR gate 114 for controlling the operation of AND gate 117. The output of DEAL circuit 91 on line 116 is the second input to AND gate 117.

The operation of the system of FIG. 7 is summarized in TABLE 2. Columns 5, 3 and 1 indicate the position of a first or reference data pulse, a second data pulse, and a third or current data pulse, respectively, in the registers. The descriptors $n-1$, $n$, $n+1$, $2n-1$, $2n$ and $2n+1$ in TABLE 2 and FIG. 7 refer to associated stages of the shift registers relative to the input to register 92. The descriptor Po in TABLE 2 refers to the output of DEAL circuit 91 and the input to register 92. Columns 4 and 2 indicate the time intervals between the first and second data pulses and the second and third data pulses, respectively. Row 3 illustrates the operation of the system when the *PRF* of an input pulse train is equal to the frequency $f_c/n$. Rows 1 and 2 and rows 3 and 4 illustrate the operation of the system when the *PRF* of the train of input pulses is greater than and less than, respectively, the frequency $f_c/n$.

When the *PRF* of an input pulse train is equal to the frequency $f_c/n$, the first and second data pulses advance through the registers at the same rate and are simultaneously present in the $2n^{th}$ and the $n^{th}$ stages thereof (TABLE 2, row 3, columns 5 and 3, respectively) and on the associated lines 104 and 96. The output of register 93 is coupled through OR gate 106 to cause AND gate 99 to change operating states and enable gate 117. Since the current data pulse is present at the input to register 92 (row 3, column 1) and on line 116 at this time, AND gate 117 is caused to change operating states during this time interval to extract the input pulse associated with the third or current data pulse.

When the *PRF* of the input pulse train is slightly higher than the frequency $f_c/n$, the time interval between successive data pulses decreases with respect to the reference time interval $nt_c$. When the time of arrival of a data pulse has advanced one clock pulse interval, that data pulse (e.g., the third data pulse referenced in row 2, column 1, TABLE 2) is clocked or entered into register 92 one clock pulse interval earlier than the previous data pulse. This decreases the associated data pulse interval from $nt_c$ to $(n-1)t_c$ (row 2, column 2, TABLE 2). The first and second data pulses are therefore present in the $2n-1^{th}$ and the $n-1^{th}$ stages of the associated registers (row 2, columns 5 and 3, respectively, TABLE 2) when the third data pulse is generated. These outputs of the registers cause AND gate 98 to change operating states to enable AND gate 117. Since the third data pulse is present on line 116 at this time, gate 117 is caused to change operating states to produce an extracted pulse on line 118.

If the time interval associated with the next data pulse is equal to $nt_c$, the operation of the system will be that indicated in row 1 of TABLE 2. The first and second pulses advance through the registers to the $2n-1^{th}$ and the $n^{th}$ stages thereof so that signals are simultaneously present on line 103 and 96 when the third data pulse is applied to register 92. The signal on line 103 is coupled through OR gate 106 to cause gate 99 to change operating states to enable gate 117. Since signals are simultaneously present on lines 115 and 116, AND gate 117 changes operating states to extract the input pulse associated with the current data pulse.

The operation of the system of FIG. 7 on a train of pulses having a *PRF* slightly less than the frequency $f_c/n$ is illustrated in rows 4 and 5 of TABLE 2.

Figure 8:
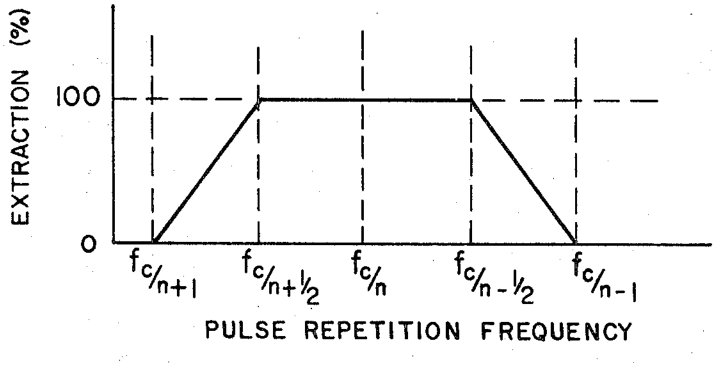
FIG. 8 is a curve illustrating the extraction provided by the system of FIG. 7.

The extraction provided by the system of FIG. 7 is illustrated in FIG. 8. This system provides 100 percent extraction of input trains of pulses having *PRF*'s between $(f_c)/(a\varepsilon½)$ and $(f_c)/(naz½)$. Outside these limits, extraction becomes intermittent and decreases linearly to zero at *PRF*'s of $(f_c)/(naI1)$ and $(f_c)/(naz1)$.

The digital delay line extractor systems are subject to a form of harmonic ambiguity that is described more fully hereinafter. Consider that the system is set to extract pulses having a *PRF* equal to the frequency $f_s$. If pulses having a *PRF* that is an integral multiple of the frequency $f_s$, e.g., $2f_s$, $3f_s$, etc., are present at the input thereof they will also be extracted. This invention provides an advantage over time domain extraction systems such as the multivibrator delay system described in the background of the invention, however, in that the extracted signal is a replica of the input signal. As used herein, the term "time domain" means that a gate is enabled for a predetermined time interval which will permit transfer of signals only during that time interval. The extracted pulse train produced by this invention is a replica of the input signal in that if the *PRF* of input pulses is $3f_n$, the *PRF* of the extracted pulses is also $3f_s$ (i.e., once the registers are loaded, all of the input pulses are extracted by the system). In the prior art multivibrator delay system, if the *PRF* of input pulses is an integral multiple of the frequency $f_s$, the *PRF* of the extracted pulses is the frequency $f_s$. There is no simple way of knowing whether the *PRF* of the extracted pulses is the frequency $f_s$ or a harmonic thereof. In this invention, since the *PRF* of the input pulses is equal to the *PRF* of the extracted pulses, the latter can be logically processed to determine its *PRF* and to eliminate this form of harmonic ambiguity.

The operation of the dual shift register extractor on input pulse trains having *PRF*'s that are integral multiples of the frequency $f_c/n$ is illustrated in TABLE 3. The numerals in TABLE 3 indicate the position of data pulses in the system wherein $n$=100. The shaded boxes in the respective columns indicate data pulses that are simultaneously present at the input to and the outputs of the registers and therefore cause the extractor to be responsive to that harmonic *PRF*.

When a pulse train having the fundamental *PRF* is processed. Consecutive adjacent pulses are employed to obtain qualification (TABLE 3, column 2). When a pulse train having a *PRF* that is a harmonic of the frequency $f_c/n$ is processed, however, the extractor only periodically responds to data pulses, e.g., to every second or third pulse depending upon the order of the harmonic *PRF* of the input pulses. This means that a number of data pulses are in transit in the registers when a higher order harmonic *PRF* is being processed. By way of example, consider that the extractor is processing a train of pulses having a second harmonic *PRF* which is equal to $2f_c/n$ (TABLE 3, column 3). When the first data pulse reaches the $n^{th}$ stage of the second register (200), the third data pulse reaches the $n^{th}$ stage of the first register (100) and the fifth data pulse is applied to the input of the first register (rows 1, 3 and 5 of column 3, respectively). The input pulse associated with the fifth data pulse is therefore extracted by the system. Although four data pulse intervals are required to extract an input pulse, all of the subsequent input pulses of the associated pulse train will be extracted by the system. The operation of the system for the third, fourth and fifth harmonics is also illustrated in TABLE 3.

One system for indicating whether the extractor is operating on a fundamental *PRF* or a harmonic thereof is illustrated in FIG. 9. This harmonic detector comprises J–K flip-flop 119, a seven stage binary counter 120 and a decoder network 130. The decoder network comprises decoders 131 through 134, inclusive. Extracted pulses on line 136 set flip-flop 119 to enable NAND gate 137. Clock pulses $C_1$ on line 9 from the clock generator are coupled through NAND gate-inverter 138 and NAND gate 137 to the first stage 121 of the counter. The outputs of each of the flip-flops comprising the counter are coupled to each of the decoders 131—134. Extracted pulses on line 136′ are also coupled through NAND gate-inverter 140 to an input of each decoder. The decoders are designed to be enabled when appropriate combinations of Q and Q are at logic 1 levels that correspond to the contents of the counter. The operation of decoders 131—134 are defined by the following relationships:

$$(\text{Data Pulse}) \times (\bar{A}BCD\bar{E}\bar{F}) = 14, \qquad (1)$$

$$(\text{Data Pulse}) \times (\bar{A}\bar{B}C\bar{D}E\bar{F}) = 20, \qquad (2)$$

$$(\text{Data Pulse}) \times (A\bar{B}\bar{C}\bar{D}\bar{E}F) = 33, \qquad (3)$$

and $$(\text{Data Pulse}) \times (\bar{A}B\bar{C}\bar{D}EF) = 50, \qquad (4)$$

respectively, where the letters designate outputs of flip-flops 121—126, respectively. The outputs of the decoders are coupled through NAND gate 141 to control the operation of one-shot multivibrator 142 and lamp 143 which indicates whether the *PRF* of the extracted pulses is equal to the fundamental or a harmonic of the frequency $f_c/n$.

In operation, flip-flop 119 is responsive to an extracted pulse on line 136 for enabling NAND gate 137 to pass clock pulses on line 144 to the counter. The contents of the counter is advanced by the clock pulses. The output of the counter that is applied to decoder network 130 is a binary indication of the number of clock pulses produced since generation of the extracted pulse. Decoders 131—134 are enabled when the contents of the counter is equivalent to a count of 14, 20, 33 or 50, respectively. When the system of FIG. 9 is employed with an extractor comprising shift registers each having 100 stages, the above counts multiplied by the clock pulse interval represent the $2^{nd}$ harmonic *PRF* through the $10^{th}$ harmonic *PRF*. If the next extracted pulse is received when the counter contains one of these counts, the pulse is gated through the associated decoder and NAND gate 141 to illuminate lamp 143 to indicate that the qualified *PRF* is a harmonic of the reference *PRF* which is equal to the frequency $f_c/n$. If the next extracted pulse is received when the contents of the counter is other than one of the above, the qualified *PRF* is the reference *PRF*.

If the contents of the counter reaches the binary indication of the number 64 prior to receipt of the next extracted pulse, the output of flip-flop 127 on line 145 resets flip-flop 119 which in turn resets the counter and disables NAND gate 137. When the next extracted pulse is received this sequence of operation is repeated. Although the output of the harmonic detector illustrated in FIG. 9 is employed to indicate that a pulse train having a harmonic *PRF* is qualified, the output may be employed for other purposes such as inhibiting the output of the extractor for all *PRF*'s except the fundamental or for automatically controlling the clock frequency to tune the system to the fundamental *PRF* of the input pulse train.

I claim:

1. Apparatus for extracting an incident pulse of a sequence of incident pulses having a particular pulse repetition frequency comprising:

a first clock generator producing first clock pulses having a first clock frequency $f_c$, first digital means comprising;

first logic means responsive to incident pulses and to said first clock pulses for producing data pulses representative of receipt of associated incident pulses; and a digital delay line having $n$ stages and responsive to said first clock pulses for entering data pulses into the first stage thereof and for advancing said entered data pulses therethrough for producing delayed data pulses corresponding to associated incident pulses, said delay line delaying said entered data pulses a predetermined time interval $n/f_c$ which is substantially equal to an integral multiple of the time interval between adjacent incident pulses having the particular pulse repetition frequency;

second logic means for logically combining at least one of said delayed data pulses corresponding to an associated incident pulse and a data pulse associated with a subsequent incident pulse to extract said subsequent incident pulse when at least said one delayed data pulse and the data pulse associated with the subsequent incident pulse are simultaneously applied to said second logic means; and third logic means for logically combining extracted pulses from said second logic means and data pulses from said first logic means for producing a residue output which is the difference therebetween.

2. Apparatus for extracting an incident pulse of a sequence of incident pulses having a particular pulse repetition frequency comprising:

a first clock generator producing first clock pulses having a first clock frequency $f_c$ and second clock pulses having a second clock frequency;

first digital delay means comprising:

first logic means responsive to incident pulses and to said first clock pulses for producing data pulses representative of receipt of associated incident pulses: and a first digital delay line having $n$ stages and responsive to said first clock pulses for entering data pulses into the first stage thereof and for advancing said entered data pulses therethrough for producing delayed data pulses corresponding to associated incident pulses, said first delay line delaying said entered data pulses a predetermined time interval $n/f_c$ which is substantially equal to an integral multiple of the time interval between adjacent incident pulses having the particular pulse repetition frequency;

second logic means for logically combining at least one of said delayed data pulses from said first delay line corresponding to an associated incident pulse and a data pulse associated with a subsequent incident pulse to extract said subsequent incident pulse when at least said one delayed data pulse and the data pulse associated with the subsequent incident pulse are simultaneously applied to said second logic means:

third logic means for logically combining extracted pulses from said second logic means and data pulses from said first logic means for producing a residue output which is the difference therebetween;

a second digital delay line having a plurality of stages and being responsive to said second clock pulses for entering residue pulses from said third logic means in the first stage of said second delay line and for advancing entered residue pulses therethrough, said second delay line delaying said entered residue pulses a time interval different from the delay of said data pulses provided by said first delay line for extracting incident pulses having a pulse repetition frequency different from the particular pulse repetition frequency; and fourth logic means logically combining at least one of said delayed residue pulses corresponding to an associated incident pulse and a subsequent residue pulse corresponding to a subsequent incident pulse for extracting said subsequent incident pulse when a delayed residue pulse and a subsequent residue pulse are simultaneously applied to said fourth logic means.

3. Apparatus for extracting an incident pulse of a sequence of incident pulses having a particular pulse repetition frequency comprising:

a first clock generator producing first clock pulses having a first clock frequency $f_c$;

first digital delay means comprising:

first logic means responsive to incident pulses and to said first clock pulses for producing data pulses representative of receipt of associated incident pulses; and a plurality of digital delay lines each having a plurality of stages, a particular one of said delay lines being responsive to first clock pulses for entering data pulses in the first stage thereof and for advancing entered data pulses therethrough for producing delayed data pulses corresponding to associated input pulses, each other one of said delay lines being responsive to first clock pulses for entering in the first stage thereof delayed data pulses from a different associated one of said delay lines; and second logic means for logically combining data pulses and delayed data pulses from each one of said delay lines for extracting the incident pulse associated with one data pulse when the one data pulse and delayed data pulses from a prescribed number of said delay lines are simultaneously applied to said second logic means.

4. Apparatus for extracting a train of incident pulses from a sequence of incident pulses having a particular pulse repetition frequency comprising:

a first clock generator producing first clock pulses having a first clock frequency $f_c$;

first digital delay means comprising:

first logic means responsive to incident pulses and to said first clock pulses for producing data pulses representative of receipt of associated incident pulses; and a digital delay line having $n$ stages and responsive to said first clock pulses for entering data pulses into the first stage thereof and for advancing said entered data pulses therethrough for producing delayed data pulses corresponding to associated input pulses, said delay line delaying said entered data pulses a predetermined time interval $n/f_c$ which is substantially equal to an integral multiple of the time interval between adjacent incident pulses having the particular pulse repetition frequency;

second logic means for logically combining at least one of said delayed data pulses corresponding to an associated incident pulse and a data pulse associated with a subsequent incident pulse to extract said subsequent incident pulse when at least said one delayed data pulse and the data pulse associated with the subsequent incident pulse are simultaneously applied to said second logic means; and means responsive to said first clock pulses and said extracted pulses for indicating whether the pulse repetition frequency of the train of extracted pulses is equal to the predetermined frequency $f_c/n$ or an integral multiple thereof.

5. Apparatus extracting an incident pulse of a sequence of incident pulses having a prescribed pulse repetition frequency comprising:

a second clock generator producing clock pulses;

fifth logic means responsive to incident pulses and to clock pulses for producing data pulses representative of receipt of associated incident pulses;

a fifth plurality of digital delay lines each having a plurality of stages, a particular one of said fifth delay lines being responsive to clock pulses for entering data pulses into the first stage thereof and for advancing entered data pulses therethrough, each other one of said fifth delay lines being responsive to clock pulses for entering into the first stage thereof delayed data pulses from the $n^{th}$ stage (where $n$ is an integer) of a different associated one of said fifth delay lines;

a sixth plurality of logic circuits, each sixth logic circuit being responsive to delayed data pulses from at least the $n-1^{th}$, $n^{th}$ and $n+1$hu th stages of an associated other one of said fifth delay lines for producing an output pulse if at least one delayed data pulse from one of said stages is applied thereto;

a seventh plurality of logic circuits, a particular one of said seventh logic circuits being responsive to delayed data pulses from the $n^{th}$ stage of said one particular line of said fifth delay lines and the output pulses from each one of said sixth logic circuits, the other ones of said seventh logic circuits each being responsive to delayed data pulses from the same stage of each line of said fifth delay lines, said seventh logic circuits individually producing an output pulse when pulses are simultaneously applied to each input of the associated individual seventh logic circuit; and eighth logic means extracting an incident pulse associated with a data pulse when the data pulse and an output pulse from any one of said seventh logic circuits are simultaneously applied to said eighth logic means.

PO-1050
(5/69)

UNITED STATES PATENT OFFICE
CERTIFICATE OF CORRECTION

Patent No. 3,575,215 Dated April 20, 1971

Inventor(s) Ronald J. Boddy

It is certified that error appears in the above-identified patent and that said Letters Patent are hereby corrected as shown below:

In the specification, column 3, line 47 (actual cou before "$C_2$" and after "clock pulse", insert --$C_1$ on lines 8 a 9; the waveform of FIGURE 4c represents input pulses on line wherein an input pulse is received immediately following gene tion of a clock pulse--.

Column 5, line 41 (actual count), delete "(n+0.0025 and insert therefor --(n+0.0025n)$t_c$--.

Column 7, line 13, delete "($f_c$)/(aEl/2) and ($f_c$)/(naZl/2)" and insert therefor --($f_c$)/(n-1/2) and ($f_c$)/(n+1/2)--.

Column 7, line 15, after "of" delete "($f_c$)/(nal 1) and ($f_c$)/(naZl)" and insert therefor--($f_c$)/(n-1) and ($f_c$)/(n+1)--.

Column 8, line 11, after "and" delete "Q", second occurrence, and insert therefor --$\overline{Q}$--.

Signed and sealed this 19th day of October 1971.

(SEAL)
Attest:

EDWARD M.FLETCHER,JR.
Attesting Officer

ROBERT GOTTSCHALK
Acting Commissioner of Pat